United States Patent [19]

Weisbrod

[11] 4,007,406
[45] Feb. 8, 1977

[54] HIGH PRESSURE, GAS FILLED, VARIABLE ELECTRICAL PARAMETER DEVICE

[75] Inventor: Marvin A. Weisbrod, Santa Clara, Calif.

[73] Assignee: International Telephone and Telegraph Corporation, New York, N.Y.

[22] Filed: Sept. 29, 1975

[21] Appl. No.: 617,970

[52] U.S. Cl. .............................. 317/245; 317/251
[51] Int. Cl.² ........................................ H01G 5/14
[58] Field of Search ................... 317/245, 244, 251

[56] References Cited
UNITED STATES PATENTS

| | | | |
|---|---|---|---|
| 2,740,077 | 3/1956 | Clarke | 317/245 |
| 3,495,142 | 2/1970 | Herrgen | 317/245 X |
| 3,646,412 | 2/1972 | Boersma | 317/244 |

*Primary Examiner*—E. A. Goldberg
*Attorney, Agent, or Firm*—William T. O'Neil

[57] ABSTRACT

A sealed variable capacitor assembly including a generally cylindrical metallic enclosure in which fixed and movable interleaving capacitor plate sets are contained, the movable set being varied by axial translation thereof by means of a leadscrew arrangement within a bellows which effects sealing while permitting the required axial translation of the movable plates. Spring fingers connected to the moving plate subassembly engage at least a portion of the inside surface of the metallic enclosure slidably. Accordingly, the RF current path from the movable plates largely bypasses the bellows permitting the latter to be of a relatively small diameter. The mounting of the fixed plate set is by means of a rigid feedthrough insulator mounted through the end-wall of the enclosure opposite the end from which the aforementioned lead-screw extends. The device is therefore adapted for operation on relatively high gas pressures therein to obtain high voltage rating without the danger of explosion inherent in glass and ceramic enclosures commonly used in similar devices.

10 Claims, 1 Drawing Figure

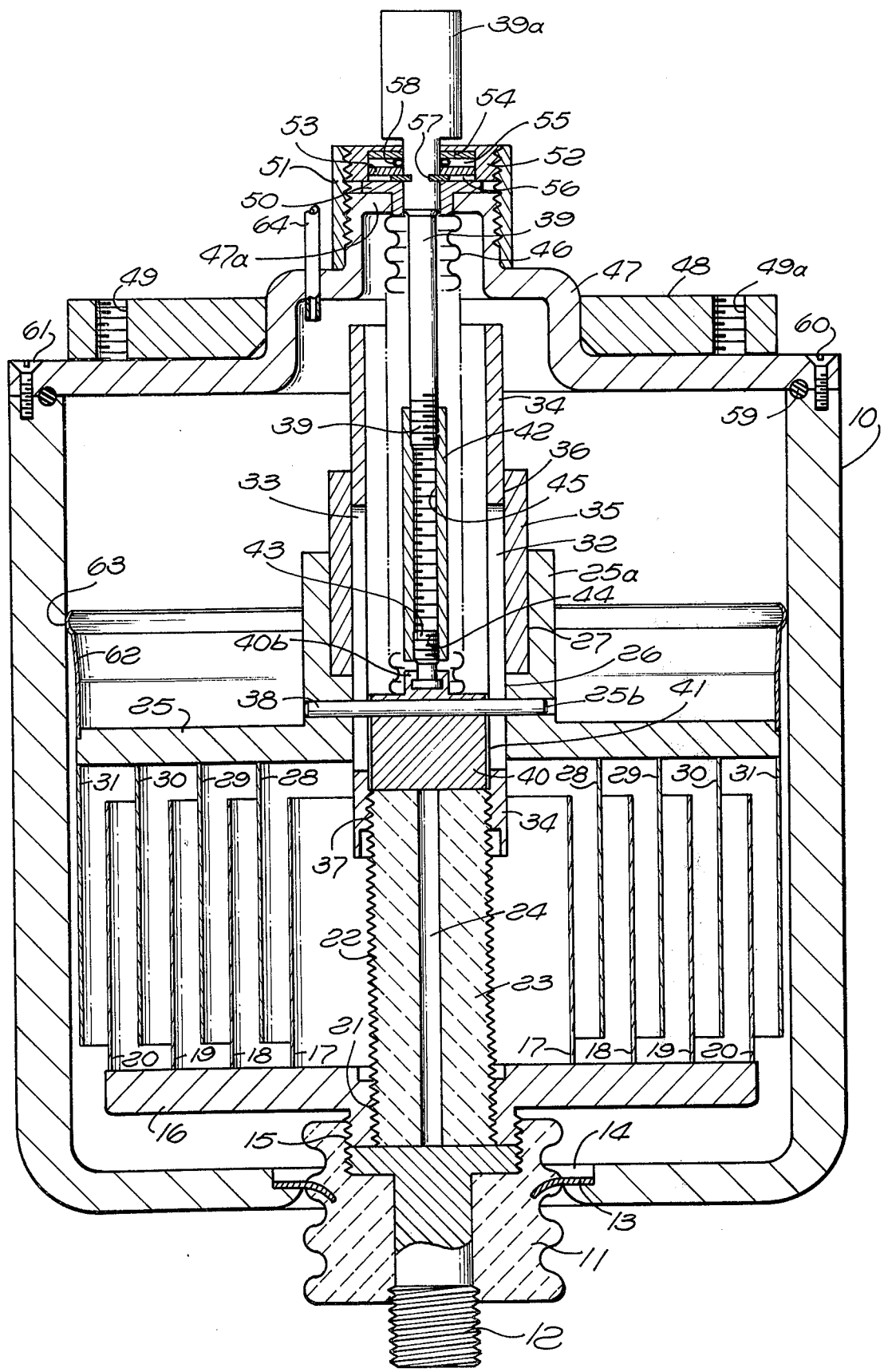

HIGH PRESSURE, GAS FILLED, VARIABLE ELECTRICAL PARAMETER DEVICE

BACKGROUND OF THE INVENTION

1. Field of the Invention

The invention relates to variable capacitors generally, and more specifically, to variable capacitors adapted for high-pressure gas filling.

2. Description of the Prior Art

Variable capacitors have been variously constructed to increase their voltage and current handling ratings. In high-powered, radio-frequency equipment, vacuum capacitors have been extensively employed. Such devices are normally enclosed within a glass or ceramic shell or enclosure, thereby to provide electrical insulation as well as hermetic sealing. U.S. Pat. Nos. 2,511,338; 2,740,926; 2,920,255; 3,257,590; and 3,270,259 (the latter providing a fluid cooling feature within the evacuated envelope) are representative of the vacuum capacitor prior art.

Inert fluids have also been used in the dielectric space between the capacitor plate sets in some types of sealed variable capacitors. The device of U.S. Pat. No. 2,867,758, although involving a substantially different combination than that of the present invention, does refer to the use of an atmosphere of inert gas in a sealed container. Various gasses have been used in such devices. One specialty gas known in the trade as sulphur hexaflouride ($SF_6$) is extensively used as an inert gas filler for various types of sealed electrical components, including variable capacitors of the type to which the present invention applies.

It is a known characteristic of the aforementioned $SF_6$ gas that its dielectric strength is a direct function of the pressure of the gas in a given vessel. In view of the various design trade-offs encountered in connection with variable capacitor design, it is very advantageous to be in a position to provide increased dielectric strength within the gaps between the plate sets of the capacitor. Accordingly, either higher voltage ratings may be achieved for the same plate spacing, or alternatively, for the same voltage rating a higher capacitance rating can be obtained by closer plate spacing with attendant reduction in size, weight and cost of the completed device.

The exploitation of the advantages of $SF_6$ gas according to the foregoing, may require that it be under a number of atmospheres of pressure. Considering, for example, a typical pressure of 100 psig in a more-or-less typical capacitor assembly having five inch enclosure (housing) diameter, it will be realized that relatively large hoop stresses are generated in the housing shell. It also follows that typical prior art enclosure materials, such as the glasses or ceramics, are unsuitable for the application. Not only is the pressure differential from inside the enclosure to the outside atmosphere greater than the maximum ever encountered in a typical vacuum capacitor structure, but also the said hoop stress is a tension force, rather than the compressive mode stress, resulting from a maximum one atmosphere pressure differential (inside to outside), as encountered in the shell of a well known prior art vacuum capacitor structure. It is well known that the typical prior art enclosure materials such as the aforementioned glasses or ceramics, have much lower inherent strength in tension, as compared to the compression mode. Thus, the use of these prior art dielectric materials for the enclosure of a pressure filled vessel severely limits the pressure which may be used and introduces the danger of explosion and fragmentation of the enclosure material with attendant potential for equipment damage and personnel injury.

The manner in which the present invention deals with the disadvantages of the prior art to provide a unique combination overcoming the prior art difficulties and providing certain additional ancillary advantages will be understood as this description proceeds.

SUMMARY OF THE INVENTION

In order to eliminate the danger of failure and explosive fragmentation of the enclosure of a gas filled variable electrical parameter device, such as a variable capacitor, the enclosure employed in the combination of the present invention is provided in the form of a metallic shell. The actual metal to be used depends on certain other well known design considerations, such as conductivity (since it will be seen that the enclosure shell provides a major current conducting function), resistance to environmental conditions, and other factors relating to producability. A typical metal might be copper or one of its alloys of relatively high strength and conductivity, although other metals might be used for specific reasons.

In the axially interleavable mechanical arrangement of a typical device in accordance with the present invention, means, such as typical spring finger sliding contactors, are provided to divert the greatest part of the current which would otherwise flow in the metal bellows of the device, from the moving plate set to the conductive enclosure wall. In this way, a relatively small diameter bellows may be used since it is relieved of the heating encountered when the bellows is relatively small compared to the radio frequency currents it carries. The enclosure is normally formed with an integral end-wall having a central opening into which a block-like, feed-through, insulator is sealed. The feed-through features is provided by a stud sealed and extending axially through the insulator to support and provide electrical connection from the exterior of the enclosure to the fixed plate set. The result is a unique insulator-support arrangement able to resist the relatively high pressure within the enclosure, while rigidly supporting the fixed plate set and, indirectly, the internal end of the bellows and lead screw which position the movable plate set in a manner which will be more fully understood as this description proceeds.

It will be noted by those skilled in this art, that among the additional advantages accruing to the device in accordance with the present invention is reduced control force required on the lead screw assembly for varying the interleaving of fixed and movable capacitor sets to vary the capacitance. Unlike typical vacuum capacitors, which tend to mechanically bias themselves to the fully interleaved position because of the atmospheric pressure within the bellows interior acting against the nearly zero reaction pressure within the evacuated enclosure interior, the movable plate mechanical bias is in the opposite direction if the gas pressure exceeds one atmosphere.

Because of the unique combination of the present invention permitting the use of a bellows of relatively small diameter, the force against which the adjustment lead screw must operate is minimized in that the area against which the differential pressure from inside to outside of the bellows operates, is greatly reduced as compared to prior art larger bellows designs.

The full significance of the advantages afforded by the unique structure will be more completely understood by the skilled reader as this description proceeds. Moreover, other ancillary advantages will also be apparent to the skilled reader.

BRIEF DESCRIPTION OF THE DRAWING

A single FIGURE drawing of a device in accordance with the present invention is presented, the drawing being a sectional view taken in a plane containing the axial centerline of the device.

DESCRIPTION OF THE PREFERRED EMBODIMENT

Referring now to the drawing, a generally cup-shaped enclosure or housing 10 is shown. This housing, as hereinbefore indicated, is essentially a metallic shell. Through the closed end, a feed-through insulator 11 is coaxially located. A conductive stud 12 is sealed coaxially within the insulator body 11, and a metallic flange 13, pre-formed into the insulator body 11, fits into a counterbore 14 (typically) within the inside end-wall of 10. Accordingly, a hermetic brazing or welding operation may be provided to seal the flange 13 to the housing member 10. An inside thread 15 within the interior end of the insulator body 11, receives a corresponding male-threaded portion of a conductive support plate 16, the latter supporting the fixed plate set comprising (as illustrated) the individual coaxial cylinder-shaped plates 17, 18, 19 and 20. These fixed plates may be hard soldered, brazed or otherwise conductively and mechanically fixed to the support plate 16. The processes and techniques by which this attachment is accomplished are well known in this art. A female thread 21 within the inside bore of the support plate member 16 receives a like male thread 22 of an insulating post 23. The center-bore 24 in this post 23 is not structurally or functionally necessary for the device, however, it does reduce the amount of ceramic material used and lightens the post 23 to some extent without detracting significantly from its overall strength.

The material of the post 23 and the body 11 of the feed-through insulator are typically low dielectric loss ceramics. The operability of the device according to the invention is, of course, not limited to ceramics, per se, for these parts, however, very satisfactory ceramics having highly desirable mechanical and electrical properties are readily available therefor.

Referring now to 25, it will be noted that this is the conductive base plate or carrier for the movable plates of the device, these being typically indicated at 28, 29, 30 and 31.

The part 25 includes a generally upward facing (as viewed from the figure) collar 25a. Within and through this collar an axial bore is provided at 26, this bore affording a sliding surface against the outside perimeter of an upward (axial extending) sleeve 34. An additional sliding surface is extant at 36 between 34 and the sleeve 35, the latter being press-fit or otherwise fixed within the inside counterbore 27, of 25a. The sleeve 34 contains inside threads which firmly mate to the outside threads 22 of part 23 generally at 37.

A pin 38 is tightly fitted, as generally illustrated, through two circumferentially opposite holes in 25a, or from one end opening against a bottom at 25b. This pin will be seen to be capable of "riding" up and down in two circumferentially opposite axially extending grooves 32 and 33 through the walls of sleeve 34, as the lead screw 39 controls the axial translation of the part 25, and those parts associated with it, mechanically, including the cylindrical plates 28, 29, 30 and 31, the pin 38 and the sleeve 35.

It is to be realized that the sliding surface 36 extends the full length of the inside surface of the sleeve 35 against 34 circumferentially where it is not opposite either of the slots 32 or 33. The "plug" 30 will be seen to be slidably installed within the inside surface of 34, the frictional bearing surface being generally at 41. A boss 40b, extending axially (generally upward as illustrated) is an integral part of 40 and has a lateral hole through which pin 38 also passes, thereby pinning the part 40 and the part 25 together. An internally threaded sleeve 42 is firmly attached to an engagement stud 43 by threads generally at 44. The said stud 43, in turn, engages the boss 40b as shown to produce a universal joint action at that point so that the rotation of lead screw 39 produces the desired axial translation of the movable plate assembly, without causing mechanical binding, by action of the internal threads 45 of 42 against the outside threads of lead screw 39. The outside surface of 42 thereby may act as a guide for bellows 46 so that it does not appreciably "buckle" laterally during operation of the lead screw 39.

The bellows 46 will be understood to be hermetically sealed by brazing, etc., to the boss 40b on one bellows end and to the upward projecting formed end of the upper housing endplate 47. An insert piece 50 is firmly fit within the axially centered end opening in 47, which limits radial movement of shaft 39a. Part 50 has an inward projecting end of generally annular cross-section at the upper bellows end. An upper flange on part 50 rests, as shown, against 47a and is held in place through the action of a threaded sleeve 51, an internally flanged nut 52 and flat washers 53, 54, 55 and 56. A "C" washer 57 engaging a groove in the upper unthreaded portion of the lead screw 39, as shown, gives the said lead screw rotational freedom but constrains it from motion axially. A thrust bearing 58 provides a frictional contact with lead screw 39.

It will be realized that there are a number of alternatives in the axial mechanical engagements, seals, etc. A mounting plate 48 is illustrated and this would be understood to be firmly fixed to the outer surface of end cover 47. The said mounting plate 48 includes typical threaded holes 49 and 49a for the mounting of the completed assembly. As implemented, the device is ideally suited to grounded mounting, corresponding to a grounded terminal for the moving plates, although it is, of course, not necessary that it be employed in such a mode. It will be noted that the part 47 is sealed by an "O" ring 59 under compression provided by attachment screws 60 and 61, typically.

Returning now to the conductive base plate 25, it will be noted that spring fingers 62, preferably in the form of a complete cylinder sliced into a relatively large plurality of individual spring fingers distributed about the entire inside surface of 10, are provided. These spring fingers may be advantageously formed in a known way from a strong and resilient metal having relatively good conductivity. One such material is beryllium copper. Thus, a sliding electrical contact is made generally at 63 which continuously connects the movable plate assembly, comprising 25 and all parts associated therewith, to the metallic housing 10 electrically. It is this connection, or "by pass", which operates to take a very large percentage of the RF current passing through the capacitor, thereby minimizing any residual current passing through the bellows 46.

Referring now to tubulation 64, this part is shown as a typical location for a gas filling port.

It will be realized that a valve, a pressure gauge and a reservoir of compressed gas may be connected to 64. Such accessories might well remain in place during operation if the capacitor were being employed in a "grounded housing mode" so that the external metal surface thereof is not "hot" (i.e., not at an above ground RF potential).

At this point it is worth observing that substantial manufacturing economies are afforded by the combination of the invention.

Neither the seal quality nor the manufacturing processing (such as vacuum furnace brazing) typical of vacuum capacitor manufacturing, need be applied in the production of the device according to the invention. The gradual loss of the inert gas dielectric is not an event fatal the serviceability of the unit. If the aforementioned pressure gauge and valve gas reservoir arrangement were provided, the gas pressure could be "topped off" as a regular maintenance procedure. Still further, the depressurization of the unit and even its disassembly for repair or reconsturction will be seen to be possible. The removal of the screws typically 60 and 61 holding the end cover 47 in place, permits the removal of 47 and everything attached thereto. The entire movable plate assembly can also be removed. These parts slide upward as a unit until the pin 38 topped out in slots 32 and 33 providing enough physical entry into the top of the unit to permit further disassembly, for example, by applying a torque on 25a to unscrew the threaded engagement at 37.

As previously indicated, many variations in material, mechanical details of assembly, and other physical aspects of the device of the present invention might be made by those skilled in this art, once the principles of the present invention are understood. Accordingly, it is not intended that the scope of the invention be limited by the drawing or this description, these being considered typical and illustrative only.

What is claimed is:

1. An enclosed, gas-filled, variable capacitor of generally cylindrical shape and including a set of fixed capacitor plates and a set of movable plates interleaving said fixed plates, and first means for varying the amount of said interleaving to vary the capacitance thereof, comprising:
    a metallic enclosure having said generally cylindrical shape and first and second end faces;
    an extendable and compressible metallic bellows extending from said enclosure first end internally within said enclosure and being connected at its internal end to said movable plate set, said first means being arranged to operate within said bellows to effect variation in the interleaving of said plate sets while maintaining said enclosure sealed;
    sliding contact means operative over at least a portion of the inside surface of said enclosure in cooperation with said movable plate set to provide a substantially continuous electrical continuity between said enclosure and said movable plates;
    and second means at said second enclosure end for insulatingly mounting said fixed plate set, said second means including a feed-through insulator having a metallic stud passing through and sealed into the body of said insulator to provide fixed mechanical support for said second plate set and external electrical connection thereto insulated from said enclosure, said insulator body and said stud projecting partly within said enclosure and partly without.

2. An enclosed variable capacitor structure particularly adapted for operation with relatively high internal gas pressures, comprising:
    a generally cylindrical conductive metallic enclosure having a central axis and including first and second end plates substantially mechanically integral with said enclosure at the axial ends of said enclosure;
    fixed and movable sets of capacitor plates arranged such that axial translation of said movable plate set produces a corresponding variation in the amount of interleaving of said capacitor plate sets, each of said plate sets being conductively affixed to a corresponding fixed and movable generally planar base members each substantially perpendicular to the axis of said enclosure;
    an axially extendable and compressible metallic bellows hermetically sealed on one end thereof to said base member for said movable plates substantially coaxially, said bellows being sealed at the other end thereof to the inside surface of said first end plate substantially coaxially, said first end plate containing a first central opening communicating the interior of said bellows with the atmosphere external to said enclosure;
    a mechanical member extending generally axially within said bellows extending from a mechanical connection to said movable plate base member through said first central opening for positioning said movable plates axially;
    and a feed-through insulator partly within and partly without said enclosure, passing through a second central opening through said second end plate, said insulator including an integral stud sealed into the body of said insulator and in electrical contact with said fixed plate set base member, thereby to provide an external electrical terminal for said fixed plate set.

3. Apparatus accordng to claim 1 in which said enclosure is further defined as being of generally circular cross-section in a plane normal to the axial centerline thereof and said feed-through insulator of said second means is also of generally circular cross-section but small in diameter than said enclosure, said insulator being located so that said metallic stud has its axial centerline substantially coincident with said enclosure axial centerline.

4. Apparatus according to claim 1 including a conductive movable base plate of generally circular cross-section to which said movable plate set is electrically and mechanically affixed, said movable base plate translating axially within said enclosure in response to said first means, and also in which said sliding contact means is further defined as comprising at least one conductive spring finger electrically and mechanically affixed to said movable base plate and bearing against the inside surface of said enclosure to provide said substantially continuous electrical continuity between said enclosure and said movable plates over the full range of interleaved positions of said movable and fixed plate sets.

5. Apparatus according to claim 3 including a conductive movable base plate of generally circular cross-section to which said movable plate set is electrically and mechanically affixed, said movable base plate translating axially within said enclosure in response to said first means, and also in which said sliding contact means is further defined as comprising at least one conductive spring finger electrically and mechanically affixed to said movable base plate and bearing against the inside surface of said enclosure to provide said substantially continuous electrical continuity between said enclosure and said movable plates over the full range of interleaved positions of said movable and fixed plate sets.

6. Apparatus according to claim 4 in which said sliding contact comprises a plurality of said spring fingers mounted on said movable base plate and distributed circumferentially thereon so as to bear against the inside surface of said enclosure at a corresponding number of circumferential locations.

7. Apparatus according to claim 5 in which said sliding contact comprises a plurality of said spring fingers mounted on said movable base plate and distributed circumferentially thereon so as to bear against the inside surface of said enclosure at a corresponding number of circumferential locations.

8. Apparatus according to claim 2 in which said mechanical member comprises an externally projecting lead screw and a mating threaded sleeve, said lead screw being axial constrained with respect to said first end plate but free to be rotated, said threaded sleeve being affixed to said base member for said movable plates, thereby to provide axial translation of said movable plate set in response to rotation of said lead screw.

9. Apparatus according to claim 8 in which said bellows is defined as having a cross-sectional diameter not substantially larger than dictated by mechanical considerations without substantial size allowance for bellows heating and current by-pass means are provided operative between the assembly formed by said movable plates with said movable base member, and at least a portion of the adjacent inside surface of said enclosure for providing a sliding electrical contact, said metallic housing thereby forming the external terminal for said movable plate set, said by-pass thereby carrying at least a portion of the capacitor current which otherwise would pass through said bellows.

10. Apparatus according to claim 2 in which said feed-through insulator is defined as having a ceramic body of diameter substantially smaller than the diameter of said enclosure and an axial depth at least as great as a major fraction of said body diameter.

* * * * *